Patented June 17, 1947

2,422,359

UNITED STATES PATENT OFFICE 2,422,359

DIAZOAMINO COMPOUNDS

Carl W. Maynard, Jr., and Emil G. Wiest, Wilmington, Del., assignors to E. I. du Pont de Nemours & Company, Wilmington, Del., a corporation of Delaware No Drawing. Original application August 7, 1942, Serial No. 454,016. Divided and this application October 29, 1943, Serial No. 508,244

5 Claims. (Cl. 260—140)

This invention relates to the dyeing of textile fibers with insoluble azo dyes, and especially to new water-soluble diazoamino compounds which are stable in alkaline medium but which regenerate the diazo components thereof in weakly acidic medium thereby enabling the regenerated diazo compound to couple with suitable azo dye coupling components to form insoluble azo dyes without forming undesirable combinations with the non-diazo radical of the diazoamino compound. The invention also relates to methods of producing said diazoamino compounds.

It is among the objects of the invention to provide new water-soluble diazoamino compounds which are stable in alkaline medium but which split up in acid medium to form diazo compounds which readily couple with azo dye coupling components. Another object of the invention is to provide stabilizers which will operate satisfactorily with negatively substituted diazo compounds. Still other objects of the invention will be apparent from the following description.

The objects of the invention are attained in general by providing diazoamino compounds which result from reacting in alkaline medium a suitable diazotized arylamine with an aminobenzene-acid-alkylol-amide wherein the acid radical is sulfon, carbox or both. The diazoamino compounds thus produced may be incorporated with a suitable azo dye coupling component into an alkaline hydrous pasty composition which contains sufficient of a printing paste thickener to enable the composition to be printed on textile material. By acidification of such a print, the diazo component is liberated, coupling ensues and the dyeing is developed on the material.

The new diazoamino compounds are made by condensing in alkaline medium the diazo of an arylamine which is devoid of water-solubilizing groups with a primary or secondary aminobenzene-acid-alkylol-amide of the class referred to and which is substituted by groups such that it will condense rather than couple when it reacts in alkaline medium with a diazo compound that is suitable for making insoluble azoic colors, such as ice-colors. The resulting diazoamino compounds can be readily split apart in acidic but not in alkaline medium to regenerate the diazo compound. A class of such diazoamino compounds has now been discovered which is represented in general by the formula

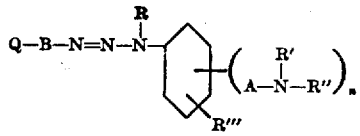

wherein B is the radical of the diazotized arylamine which is devoid of water-solubilizing groups and condensed with the aminobenzene-acid-alkylol-amide; R is one of a group consisting of hydrogen, alkyl having 1 to 4 carbons, hydroxyethyl, and tris(hydroxy methyl)methyl; A is —SO$_2$— or —CO— when $n$ is 1, and when $n$ is 2 both acid groups may be sulfon or carbox, or one may be sulfon and the other carbox; R' is one of a group consisting of hydrogen and alkylol having 1 to 4 carbons; R'' is an alkylol radical having 1 to 4 carbons and 1 to 4 hydroxy groups wherein no more than one hydroxyl group is linked to a single carbon and the ratio of carbon atoms to hydroxy groups is not greater than 2 to 1; $n$ is an integer not greater than 3; R''' is one of a group consisting of hydrogen, nitro, chloro, bromo, —CH$_2$OH, alkyl having 1 to 4 carbons and alkoxy having 1 to 2 carbons; Q is either hydrogen, a radical of the benzene series or a stabilized azo radical in form similar to the group

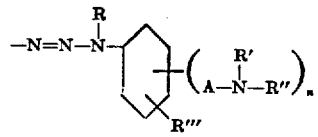

depending on whether the azo compound which is stabilized is derived from a mono- or a di-amino aryl compound.

Compositions suitable for making prints on textile materials are made by incorporating the diazoamino compound and an azoic dye coupling component into a hydrous alkaline paste which contains a sufficient proportion of pasty thickening agent to enable a print to be impressed on textile fibers from a print forming device, such as a printing block or etched printing roller. Hydrated starch, gum tragacanth or a mixture of these thickeners are desirable thickening agents for this purpose. A mono alkyl ether of ethylene glycol, such as the mono ethyl ether of ethylene glycol ("Cellosolve") is a desirable constituent of such printing pastes, and more or less of this constituent may be present as a solubilizing agent for the diazoamino compound.

When a print is made on the fabric with the alkaline printing composition, the print is developed by exposing it to an acid medium, such as a vapor-bath consisting of steam and the vapor of an acid, such as formic or acetic acid, until the print is acidified and coupling has been completed. Upon being acidified the diazo compound is regenerated and dyeing of the fiber takes place from the resulting coupling of the diazo compound with the associated coupling component and fiber in the acidified medium.

It has been found that the described class of diazoamino compounds operate in the described manner to develop bright clear shades and the dyeings made thereby are very fast to light and washing.

It has been found further that the aminobenzene-acid-alkylol-amides referred to have the surprising ability to regenerate negatively substituted diazos and to prevent diazo exchange in such diazoamino compounds.

The invention will be more fully set forth in the following more detailed description which includes examples that are given as illustrative embodiments of the invention and not as limitations thereof. Parts are expressed in parts by weight unless otherwise noted.

*Example 1*

A solution containing 18.9 parts by weight of the diazonium chloride of 4-chloro-2-amino toluene in 102 parts of water was made and diazotized in the customary manner by reacting 14.2 parts 4-chloro-2-amino toluene with 6.9 parts of sodium nitrite in a medium composed of 20.8 parts of 20° Bé. hydrochloric acid and 20 parts of water previously cooled to 0 to 5° C. by adding 60 parts of ice. The diazo solution was clarified at 5° C. by stirring into it 3 parts of animal charcoal and 3 parts of "Filter-Cel" and then filtering.

The filtered solution was slowly added with stirring to a solution containing 21.2 parts 3-amino-benzene-sulfon-ethanol-amide in 150 parts water at 0 to 5° C. Simultaneously a solution composed of 14 parts of solid anhydrous sodium carbonate and 50 parts of water was added at such a rate that the reaction mixture was maintained at an alkalinity indicated by deep red to brilliant yellow paper. The addition was completed in an hour, and stirring was maintained from one to three hours longer until the reaction was complete and free diazo compound no longer existed in the solution. The diazoamino compound thus formed was isolated by adding 60 parts of solid sodium chloride to the reaction medium, stirring for one-half hour and filtering. When dried in an oven at 55° C. the diazoamino compound was an orange-brown powder which was soluble in water and caustic solutions.

The product is represented by the formula

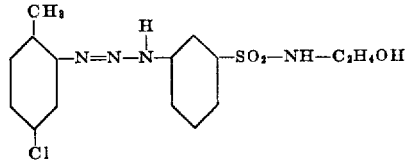

*Example 2*

To a solution of 31.2 parts 3-amino-benzene-sulfon-tris(hydroxy methyl)methyl-amide and 20.5 parts of sodium acetate in 100 parts of water at 0 to 5° C. was added a filtered solution composed of 18.9 parts of the diazonium chloride of 4-chloro-2-amino toluene in 102 parts of water prepared as described in Example 1. A solution of 11 parts of solid sodium bicarbonate in 50 parts of water was added over a period of one to two hours until the reaction solution was strongly alkaline to brilliant yellow paper. The solution was stirred for one to two hours longer until the reaction was complete, 75 parts of solid sodium chloride were added, and the mixture was stirred at 5° C. for one hour. The somewhat tarry diazoamino compound was removed by filtration, and dried in a vacuum oven at 55° C. The completely dry diazoamino product is a brown powder, but is tarry when moist. It is soluble in water and caustic solutions.

The product is represented by the formula

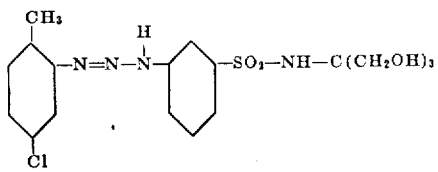

*Example 3*

A solution of 21.6 parts of the diazonium chloride of 4-nitro-2-amino anisole in 101 parts of water was prepared by reacting 16.8 parts of 4-nitro-2-amino-anisole with 6.9 parts of sodium nitrite in a medium composed of 20.8 parts of 20° Bé. hydrochloric acid and 20 parts of water which was cooled to 0 to 5° C. by adding 60 parts of ice. The diazo solution was clarified by stirring it with 3 parts of animal charcoal and 3 parts of "Filter-Cel" and filtering.

The filtered solution was added with stirring to a solution composed of 33.9 parts of 1-amino-benzene-2,4-di(sulfon-ethanol-amide) and 20.5 parts of sodium acetate in 100 parts of water. The mixture was maintained at 0 to 5° C. by external cooling. The solution was rendered strongly alkaline to brilliant yellow paper by the addition of 14 parts of solid sodium carbonate in 25 part of water. The mixture was then stirred for one to three hours until the reaction was complete. The product was separated by adding 60 parts of solid sodium chloride and stirring at 0° C. for one to three hours. The somewhat tarry diazoamino compound was removed by filtration and dried in a vacuum oven at 55° C. When completely dry, it is a brown powder, soluble in water and caustic solutions.

The product is represented by the formula

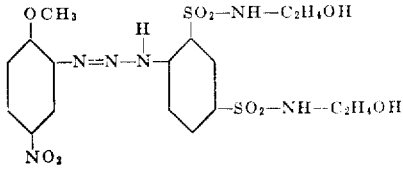

*Example 4*

A solution containing 21 parts of the diazonium chloride of 2,5-dichloraniline in 153 parts of water was prepared by reacting 16.2 parts of 2,5-dichloraniline according to the usual diazotization procedures with 6.9 parts of sodium nitrite and 75 parts of 20° Bé. hydrochloric acid in 20 parts of water cooled to 0 to 5° C. by the addition of 60 parts of ice. The solution was clarified by stirring into it 5 parts of animal charcoal and 8 parts of "Filter-Cel," and then filtering.

The filtered solution was slowly added to a solution of 56.3 parts of N-tris(hydroxy methyl)-methyl - aniline - 2,4-di [sulfon - tris(hydroxy methy)-methyl-amide] in 100 parts of water at 0 to 5° C. Simultaneously, 31.8 parts of solid sodium carbonate were gradually added so as to maintain a strong alkalinity. The reaction was completed by stirring from one to four hours at 5° C., and then the solution was warmed to 55° C. and filtered. The filtrate was cooled externally with an ice-salt bath to —5° C., 65 parts of solid sodium chloride were added, and stirring was continued for one to three hours. The tarry precipitate was isolated by filtration and dried in a vacuum oven at 55° C. The product is a low-melting amorphous substance, brown in color, and very soluble in water.

The product is represented by the formula

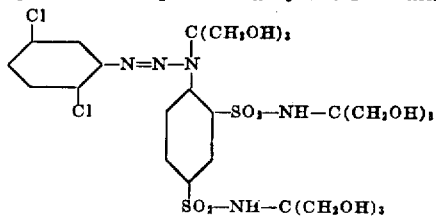

Example 5

A solution containing 21.6 parts of the diazonium chloride of 4-nitro-2-amino anisole in 101 parts of water was prepared as described in Example 3.

The filtered solution was added to a solution of 42.5 parts of N-tris(hydroxy methyl)methyl-aniline - 4 - nitro - 2 - sulfon - N - tris(hydroxy methyl)-methyl-amide in 100 parts of water, and the diazoamino product was formed and isolated as described in Example 3. The completely dry diazoamino is a brown powder, fairly soluble in water, and soluble in a mixture of water and "Cellosolve."

The product is represented by the formula

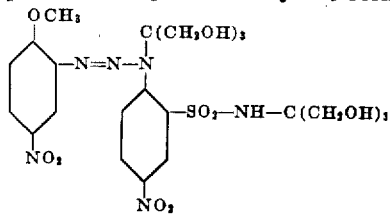

Example 6

A solution containing 21.6 parts of the diazonium chloride of 4-nitro-2-amino anisole in 101 parts of water was prepared by the method described in Example 3.

The filtered solution was added to a solution composed of 47.3 parts of N-methyl-aniline-2,4-di [sulfon-tris(hydroxy methyl)methyl-amide] dissolved in 100 parts of water at 0 to 5° C. The reaction was completed and the product was isolated by the procedure described in Example 4. The product is a low-melting, brown amorphous material, which is water-soluble.

The product is represented by the formula

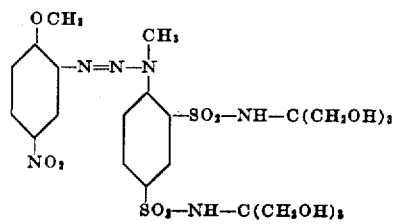

Example 7

A solution containing 18.9 parts of the diazonium chloride of 4-chloro-2-amino-toluene in 102 parts of water was prepared by the procedure described in Example 1.

The filtered solution was added to a solution of 31.1 parts of 1-amino-3-chloro-benzene-4-sulfon-tris(hydroxy methyl)methyl-amide. The reaction was completed and the product was isolated under the conditions similar to those described in Example 1. The dried product is a brown-orange powder, soluble in water and "Cellosolve," and in water and caustic.

The product is represented by the formula

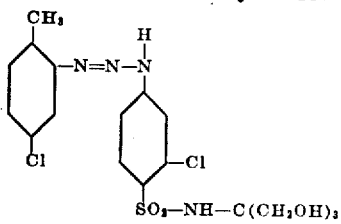

A diazoamino compound having similar properties is made in accordance with the foregoing example by using an equivalent of 1-amino-3-bromo - benzene-4-sulfon-tris(hydroxy methyl) methyl-amide instead of the chloro substituted compound set forth therein.

Example 8

A solution containing 21.6 parts of the diazonium chloride of 4-nitro-2-amino anisole in 101 parts of water was prepared by the procedure described in Example 3.

The filtered solution was added with stirring to a solution composed of 30.3 parts of 1-amino-benzene - 3 - (carbox-ethanol-amide)-5-(sulfon-ethanol-amide) dissolved in 100 parts of water. The reaction and isolation were completed according to the procedure described in Example 3. The diazoamino compound thus obtained is a brown amorphous product, soluble in water and caustic.

The product is represented by the formula

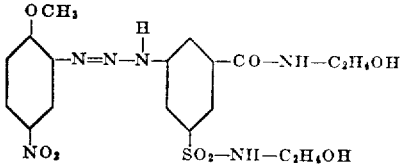

The diazoamino compounds of the type described above are desirably prepared for printing purposes by incorporating them in pastes with water, "Cellosolve," sodium hydroxide, starch-tragacanth gum and a coupling component. The following exemplary compositions of such pastes are expressed in terms of parts by weight.

Example 9

A printing paste was made by mixing

| | Parts |
|---|---|
| The diazoamino product described in Example 2 | 1.82 |
| Ortho-toluidide of beta-oxy naphthoic acid | 1.43 |
| A sodium hydroxide solution containing 35 parts by weight solid sodium hydroxide in 100 parts of aqueous solution | 3.0 |
| "Cellosolve" | 3.72 |
| Water | 15.03 |
| Starch-tragacanth gum | 75.0 |

The paste was applied to an engraved printing cylinder and the cylinder was pressed firmly onto cotton cloth so as to transfer the paste to the cloth in the engraved pattern. The cloth was then placed in a vapor-bath consisting of steam and acid vapors, such as vapors of formic or acetic acid. In the vapor bath, the diazoamino compound was split and the diazo component was liberated so that it immediately reacted with the coupling component present in the paste and developed the desired color upon the cloth. The dyeing was a beautiful bright red shade which was very fast both to light and to washing.

*Example 10*

A printing paste was made by mixing

| | Parts |
|---|---|
| The diazoamino product described in Example 3 | 2.59 |
| The ortho-anisidide of beta-oxy naphthoic acid | 1.47 |
| A sodium hydroxide solution containing 35 parts by weight of solid sodium hydroxide in 100 parts of aqueous solution | 2.2 |
| "Cellosolve" | 3.72 |
| Water | 20.02 |
| Starch-tragacanth gum | 70.0 |

When applied to cotton cloth and treated as described in Example 9, the paste produced a deep brilliant red print which was very fast to light and to washing.

*Example 11*

A printing paste was made by mixing

| | Parts |
|---|---|
| The diazoamino product from the diazonium chloride of 2,5-dichloraniline with 1-ethylamino-benzene - 2,4 - di[sulfon-tris tris (hydroxy methyl) methyl-amide] | 3.68 |
| The ortho-phenetidide of beta-oxy naphthoic acid | 1.54 |
| A sodium hydroxide solution containing 35 parts by weight of solid sodium hydroxide in 100 parts of aqueous solution | 2.2 |
| "Cellosolve" | 3.72 |
| Water | 18.86 |
| Starch-tragacanth gum | 70.0 |

The print produced on cotton cloth with this paste was a full orange shade which was fast to light and to washing.

*Example 12*

A solution containing 33.8 parts of the tetrazonium chloride of dianisidine in 200 parts of water was prepared by reacting 24.4 parts of dianisidine with 13.8 parts of sodium nitrite in a medium composed of 41.6 parts of 20° Bé. concentrated hydrochloric acid and 100 parts of water which was cooled to 0 to 5° C. by the addition of 60 parts of ice. The diazo solution was clarified at 5° C. by stirring into it 3 parts of animal charcoal and 3 parts of "Filter-Cel" and then filtering.

The filtered solution was added slowly with stirring to a solution containing 94.6 parts of N-methylamino-benzene-2,4 - di[sulfon-tris(hydroxy methyl)methyl-amide] in 300 parts of water at 0 to 5° C. Simultaneously a solution of 28 parts of solid anhydrous sodium carbonate in 150 parts of water was added at such a rate that the reaction mixture was maintained at an alkalinity indicated by deep red to brilliant yellow paper. The addition was completed in an hour, and stirring was maintained for one to four hours longer until free diazo compound no longer was present in solution. The diazoamino compound was isolated by adding 100 parts of solid sodium chloride to the reaction medium, stirring one-half hour and filtering. When dried in an oven at 55° C., the diazoamino compound was an orange-brown powder which was soluble in a mixture of water, caustic and 'Cellosolve."

The product is represented by the formula:

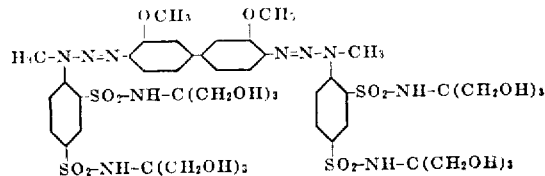

The diazoamino product may be utilized in a printing paste of the following composition:

| | Parts |
|---|---|
| The diazoamino product from the tetrazonium chloride of dianisidine with N-methyl - amino - benzene - 2,4-di[sulfon - tris(hydroxy methyl) methyl-amide] | 12.12 |
| The ortho-phenetidide of beta-oxy-naphthoic acid | 3.08 |
| A sodium hydroxide solution containing 35 parts by weight of solid sodium hydroxide in 100 parts of aqueous solution | 4.0 |
| "Cellosolve" | 3.8 |
| Water | 19.0 |
| Starch-tragacanth gum | 58.0 |

The print produced on cotton cloth with this paste, after exposure to steam-acetic acid vapors as previously described, was bright blue and had excellent fastness to light and to washing.

The proportions and kinds of compounds of the printing pastes can be widely varied. The nature of the solvent in the pastes may be varied considerably to allow for variations in solubility of the various alkylol-amide stabilizers and other solubilizing agents, dispersing agents and assistants. Any thickener can be used and the relative proportions thereof can be varied within wide limits so long as the paste has properties suitable to enable one to make prints with it on the fabric by the use of fabric printing appliances such as engraved rollers, printing blocks and the like. The diazoamino compounds stabilized solely with carboxy-alkylol-amides are considerably less soluble than those stabilized with the compounds containing at least one sulfon-alkylol-amide group, and consequently they require more capable solvents in the paste. Such a paste might contain alcohol, ethylene glycol, ethylene-glycol-monobutyl ether, a low molecular weight aliphatic hydroxyamine, a quaternary ammonium type base or a mixture of such solvents. Dispersing agents suitable for incorporating into the paste are leukanol, aryl sulfonic acids, lecithin sulfonates and alkyl sulfates. The dispersing agents and solvents, such as "Cellosolve" may be omitted in pastes containing the more soluble diazoamino compounds, such as the diazoamino compound of Example 4. The components of the dye to be produced may be present in the paste in equimolecular proportions or an excess of either one may be present. However, it is preferred that a small excess of the coupling component be present in the paste over that which is required to couple with the diazo of the diazoamino compound. For example, a desirable proportion is 1 mole of diazoamino compound to 1.1 mole of coupling component, or 1 mole of tetrazoamino compound to 2.2 moles of coupling component.

The diazoamino compounds of the present invention are especially advantageous in avoiding spottiness in prints made with alkaline printing pastes and in facilitating the printing where strength is desired. This is believed to be due to their ability to maintain in solution in the alkaline paste an exceptionally high concentration of available diazo as compared, for example, with diazoamino compounds in which the amide group is an amide of the aliphatic series.

The stabilized diazo compounds of the present invention may be produced from any diazo component which is devoid of water-solubilizing groups, such as sulfonic acid and carboxylic acid groups. Typical primary arylamines from which such diazo compounds can be produced are aniline, its homologues, its non-soluble substituted derivatives, xenylamine, naphthylamines such as beta-naphthylamine, amino-anthracenes, 1-amino-anthraquinone, heterocyclic amines and the tetrazotizable diamines.

Numerous modifications may be made in the preparation of the diazoamino compounds. The essential of the reaction is the condensation in alkaline medium of a diazonium salt with a member of a class of soluble primary or secondary aminobenzene-acid-alkkylol-amides which are incapable of coupling with the diazo compound. There is no essential order in which the components of the reaction must be mixed in making the diazoamino compounds. The alkalinity may be produced by the addition of any acid-binding agent, such as pyridine, the carbonate or bicarbonate of ammonium, sodium or magnesium, or alkali metal hydroxides. Still other conditions of the reaction may be widely varied, such as the rate of mixing the constituents and the stirring. It is important to maintain a low temperature until the diazo compound has completely reacted with the amino group of the stabilizer. Any low temperature which is sufficient to prevent excessive decomposition of the diazo is satisfactory. The preferred temperature of reaction is about 0 to about 10° C.

Carbonates of sodium and ammonium, such as ammonium carbonate, sodium carbonate and sodium bicarbonate are the preferred acid-binding agents for the preparation of the diazo-amino compounds.

As illustrative of other compounds from which are produced other suitable diazoamino compounds of the invention which have the desirable properties of those described and which are made by combining them with the diazos of the class described in the manner illustrated in the foregoing examples are N-propyl-aniline-2,4-di[sulfon-tris(hydroxy methyl)-methyl-amide], 1-amino-benzene-3,5-di(sulfon-ethanol-amide), 4-nitro-N-(beta-hydroxy ethyl)-aniline-2-s u l f o n-ethanol-amide, 1-amino-benzene-2,4-di(sulfon-diethanol-amide), 1-amino-benzene-3-(carbox-diethanol-amide)-5-(sulfon-diethanol-a m i d e), 1-(b e t a-hydroxy ethyl)-aniline-2-(carbox-ethanol-amide)-5-(sulfon-ethanol-amide), 1-butyl-amino-benzene-2-[carbox-tris(hydroxy methyl)-methyl-amide]-4-[sulfon-tris(hydroxy methyl)-methyl-amide], 1-amino-6-chlorobenzene-2,4-di-[carbox-tetrahydroxy-n-butyl)-amide], 1-ethyl-a m i n o-4-methylol-benzene-2-[carbox-tetrahydroxy-n-butyl)-amide], 1-a m i n o-benzene-2-(carbox-tetrahydroxy-n-butyl-amide)-4-(sulfon-tetrahydroxy-n-butyl-amide), 1-methylamino-6-m e t h y l - b e n z e n e -2-[sulfon-(dimethanol)-amide]-4-[carbox-(dimethanol)amide], 1-e t h-anolamino-6-methoxy-benzene-3-sulfon-m e t h-anol-amide and 1-ethanolamino-benzene-2,4,6-tris(sulfon-methanol-amide).

The following examples are illustrative of other stabilized diazo compounds which were made in accordance with the processes hereinbefore described. The resulting diazoamino compounds and the coupling components noted in these examples were used to make printing pastes similar to those hereinbefore described. The pastes were printed on cotton fabric and developed thereon by acidification, producing the shades noted. The diazoamino compounds of these examples have the desirable properties of the compounds of the foregoing examples.

| Example | Diazo Component | Stabilizer | Coupling Component | Shade on Cotton |
|---|---|---|---|---|
| 13 | dianisidine | $HO-C_2H_4NHSO_2-\bigcirc(NH_2)-SO_2-NH-C_2H_4-OH$ | anilide of beta hydroxy naphthoic acid | Navy blue. |
| 14 | do | $HO-C_2H_4NHSO_2-\bigcirc(NH_2)-SO_2-NH-C_2H_4OH$ | p-phenetidide of aceto-acetic acid | Golden yellow. |
| 15 | cresidine | $NH-C_2H_4-OH$ on ring with $-SO_2-NH-C(CH_2OH)_3$ and $NO_2$ | m-nitro-anilide of beta hydroxy naphthoic acid | Bordeaux. |
| 16 | p-chlor-ortho anisidine | $NH-C_3H_7$ on ring with $-SO_2-NH-C(CH_2OH)_3$ and $SO_2-NH-C(CH_2OH)_3$ | p-phenetidide of aceto-acetic acid | Green yellow. |

| Example | Diazo Component | Stabilizer | Coupling Component | Shade on Cotton |
|---|---|---|---|---|
| 17 | p-chlor-ortho anisidine | 1,4-bis(NH-C₃H₇ / SO₂-NH-C(CH₂OH)₃)-benzene with additional SO₂-NH-C(CH₂OH)₃ | o-anisidide of beta hydroxy naphthoic acid | Bluish red. |
| 18 | do | NH-C₃H₇ / SO₂-NH-C(CH₂OH)₃ / SO₂-NH-C(CH₂OH)₃ substituted benzene | m-fluor-anilide of beta hydroxy naphthoic acid | Blue red. |
| 19 | 5-chlor-2-methyl aniline | NH₂ / (HO-C₂H₄)₂N-CO- benzene -SO₂-N(C₂H₄OH)₂ | alpha-naphthylamide of aceto-acetic acid | Red yellow. |
| 20 | 4-chlor-6-ethoxy aniline | NH₂ / (HO-C₂H₄)₂N-CO- benzene -SO₂-N(C₂H₄OH)₂ | 3-chlor-6-methoxy anilide of aceto-acetic acid | Yellow. |
| 21 | 2,5-dimethyl-4-chlor-aniline | NH₂ / (HOCH₂)₃CNHSO₂- benzene -CO-NH-C(CH₂OH)₃ | 2-methyl-5-chlor anilide of aceto-acetic acid | Green yellow. |
| 22 | 3-benzoyl-amino-4 methoxy aniline | NHCH₃ / (HOCH₂)₃CNHSO₂- benzene -CO-NH-C(CH₂OH)₃ | anilide of beta hydroxy naphthoic acid | Bordeaux. |
| 23 | 4,5-dichloro-2-amino 1-methyl benzene | NHCH₃ / (HOCH₂)₃CNHSO₂- benzene -CO-NH-C(CH₂OH)₃ | m-nitroanilide of beta hydroxy naphthoic acid | Red. |
| 24 | 5-nitro-2-amino-1 methyl-benzene | NH-C₃H₇ / SO₂-NHC(CH₂OH)₃ / SO₂-NHC(CH₂OH)₃ substituted benzene | o-toluidide of beta hydroxy naphthoic acid | Do. |
| 25 | 4,6-dichloro-2-amino methyl benzene | NH-C₃H₇ / SO₂-NHC(CH₂OH)₃ / SO₂-NHC(CH₂OH)₃ substituted benzene | p-anisidide of beta hydroxy naphthoic acid | Do. |
| 26 | p-nitro-o-toluidine | NH-C₃H₇ / SO₂-NHC(CH₂OH)₃ / SO₂-NHC(CH₂OH)₃ substituted benzene | beta-naphthylamide of aceto-acetic acid | Yellow |

| Example | Diazo Component | Stabilizer | Coupling Component | Shade on Cotton |
|---|---|---|---|---|
| 27 | 5-chloro-2-toluidine | NH—C$_4$H$_9$, SO$_2$—NHC(CH$_2$OH)$_3$, SO$_2$—NHC(CH$_2$OH)$_3$ (on benzene ring) | o-tolidide of aceto-acetic acid | Green yellow. |
| 28 | 4-benzoylamino-2, 5-diethoxy aniline | NH—C$_2$H$_4$OH, SO$_2$—NH—C$_2$H$_4$OH, SO$_2$—NH—C$_2$H$_4$OH (on benzene ring) | anilide of beta hydroxy naphthoic acid | Blue. |
| 29 | 3-benzoylamino-4-methoxy aniline | NH—C$_2$H$_4$OH, SO$_2$—NH—C$_2$H$_4$OH, SO$_2$—NH—C$_2$H$_4$OH (on benzene ring) | 5-chloro-2-tolidide of beta hydroxy naphthoic acid | Violet. |
| 30 | 4-chloro-2-nitro aniline | NH—C$_2$H$_4$OH, SO$_2$—NH—C$_2$H$_4$OH, SO$_2$—NH—C$_2$H$_4$OH (on benzene ring) | m-nitranilide of beta hydroxy naphthoic acid | Red. |
| 31 | 4-furoyl-amino-2,5-diethoxy aniline | NH—C$_2$H$_4$OH, SO$_2$—NH—C$_2$H$_4$OH, SO$_2$—NH—C$_2$H$_4$OH (on benzene ring) | anilide of beta hydroxy naphthoic acid | Blue. |
| 32 | 2,5-dimethyl-4-chlor aniline | NH—C$_2$H$_4$OH, SO$_2$—NH—C$_2$H$_4$OH, SO$_2$—NH—C$_2$H$_4$OH (on benzene ring) | 2-methyl-5-chlor-anilide of aceto acetic acid | Green yellow. |
| 33 | 3-brom-6-methoxy aniline | NH—C$_2$H$_4$OH, SO$_2$—NH—C$_2$H$_4$OH, SO$_2$—NH—C$_2$H$_4$OH (on benzene ring) | 2-methyl-5-chlor-anilide of aceto-acetic acid | Do. |

This is a division of our copending application Serial No. 454,016.

We claim:

1. A diazoamino compound of the benzene series which is represented by the formula

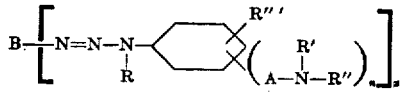

wherein B is the radical of an ice-color diazo component which is devoid of water-solubilizing groups; R is one of a group consisting of hydrogen, alkyl having 1 to 4 carbons, hydroxyethyl and tris-(hydroxymethyl)methyl; A is from a group consisting of —SO$_2$— and —CO—; R' is one of a group consisting of hydrogen and the alkylol groups having 1 to 2 carbons; R'' is one of a group consisting of alkylol groups having 1 to 4 carbons and 1 to 4 hydroxy groups wherein not more than one hydroxy group is linked to a single carbon and the ratio of carbon atoms to hydroxy groups is not greater than 2 to 1; R''' is one of a group consisting of hydrogen, nitro, chloro, bromo, —CH$_2$OH, alkyl having 1 to 4 carbons and alkoxy having 1 to 2 carbons; $n$ is 2 and $x$ is an integer not greater than 2.

2. A diazoamino compound which is represented by the formula

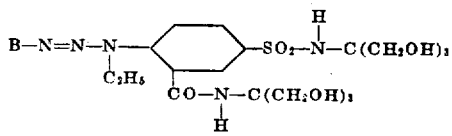

wherein B is the radical of an ice-color diazo component which is devoid of water-solubilizing groups.

3. A diazoamino compound represented by the formula

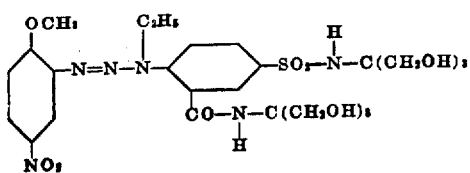

4. A diazoamino compound represented by the formula

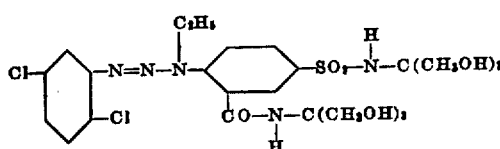

5. A diazoamino compound represented by the formula

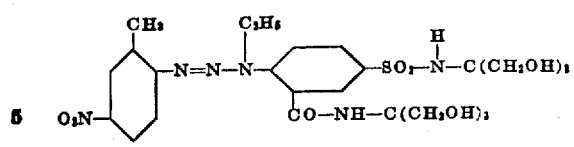

CARL W. MAYNARD, JR.
EMIL G. WIEST.

REFERENCES CITED

The following references are of record in the file of this patent:

UNITED STATES PATENTS

| Number | Name | Date |
| --- | --- | --- |
| 2,229,744 | Kern | Jan. 28, 1941 |
| 1,867,088 | Ossenbeck et al. | July 12, 1932 |
| 2,069,461 | Petitcolas | Feb. 2, 1937 |

FOREIGN PATENTS

| Number | Country | Date |
| --- | --- | --- |
| 44,229 | The Netherlands | Oct. 15, 1938 |

Certificate of Correction

Patent No. 2,422,359. June 17, 1947.

CARL W. MAYNARD, JR., ET AL.

It is hereby certified that errors appear in the printed specification of the above numbered patent requiring correction as follows: Column 4, line 47, Example 3, for "25 part" read *25 parts*; column 7, line 37, Example 11, before "(hydroxy methyl)" strike out "tris"; and that the said Letters Patent should be read with these corrections therein that the same may conform to the record of the case in the Patent Office.

Signed and sealed this 5th day of August, A. D. 1947.

[SEAL]

LESLIE FRAZER,
*First Assistant Commissioner of Patents.*

3. A diazoamino compound represented by the formula

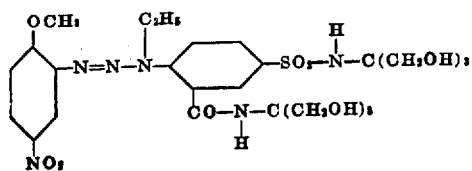

4. A diazoamino compound represented by the formula

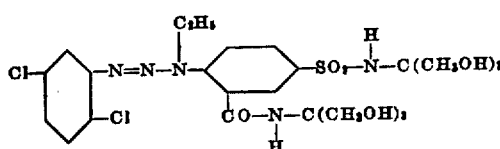

5. A diazoamino compound represented by the formula

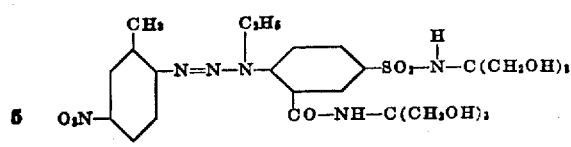

CARL W. MAYNARD, JR.
EMIL G. WIEST.

REFERENCES CITED

The following references are of record in the file of this patent:

UNITED STATES PATENTS

| Number | Name | Date |
|---|---|---|
| 2,229,744 | Kern | Jan. 28, 1941 |
| 1,867,088 | Ossenbeck et al. | July 12, 1932 |
| 2,069,461 | Petitcolas | Feb. 2, 1937 |

FOREIGN PATENTS

| Number | Country | Date |
|---|---|---|
| 44,229 | The Netherlands | Oct. 15, 1938 |

Certificate of Correction

June 17, 1947.

Patent No. 2,422,359.

CARL W. MAYNARD, JR., ET AL.

It is hereby certified that errors appear in the printed specification of the above numbered patent requiring correction as follows: Column 4, line 47, Example 3, for "25 part" read *25 parts*; column 7, line 37, Example 11, before "(hydroxy methyl)" strike out "tris"; and that the said Letters Patent should be read with these corrections therein that the same may conform to the record of the case in the Patent Office.

Signed and sealed this 5th day of August, A. D. 1947.

[SEAL]

LESLIE FRAZER,
*First Assistant Commissioner of Patents.*